United States Patent [19]

Kim

[11] Patent Number: 5,134,497
[45] Date of Patent: Jul. 28, 1992

[54] METHOD AND APPARATUS FOR SELECTING FUNCTIONAL MODES OF VIDEO CAMERA RECORDER USING A ONE KEY WIRE REMOTE CONTROLLER

[75] Inventor: Dong-young Kim, Suwon, Rep. of Korea

[73] Assignee: SamSung Electronics Co., Ltd., Suweon, Rep. of Korea

[21] Appl. No.: 491,976

[22] Filed: Mar. 12, 1990

[30] Foreign Application Priority Data

Jul. 21, 1989 [KR] Rep. of Korea ............... 89-10444

[51] Int. Cl.$^5$ .................... H04N 5/00; G11B 19/60
[52] U.S. Cl. ................... 358/335; 360/137; 360/69
[58] Field of Search ............ 358/335, 906; 360/137, 360/69, 33.1, 35.1, 74.1

[56] References Cited

U.S. PATENT DOCUMENTS 4,794,471 12/1988 Shimada et al. ............ 360/137
4,897,742 1/1990 Hashimoto ............ 360/74.1
4,939,601 7/1990 Endo et al. ............ 360/137

Primary Examiner—Roy N. Envall, Jr.
Assistant Examiner—Khoi Truong
Attorney, Agent, or Firm—Robert E. Bushnell

[57] ABSTRACT

A method for selecting made by one key in the camera recorder is disclosed. The mode selecting method comprises a first step for changing the present mode into the temporary stop mode, the stop mode or the reproduce mode after reading the present mode when one key is pressed one time, a second step for changing the present mode into the fast forward mode or the forward picture search mode after reading the present mode when one key is pressed two times, a third step for changing the present mode into the rewind mode or reverse picture search mode after reading the present mode when one key is pressed three times, and a fourth step for changing the present mode into the standstill picture mode or the record check mode after reading whether one key is pressed the predetermined time or over.

10 Claims, 4 Drawing Sheets

FIG. 3

| PRESENT MODE \ CHANGING MODE | a | b | c | d |
|---|---|---|---|---|
| STOP | PLAY | FF | REW | — |
| FF | STOP | — | REW | — |
| REW | STOP | FF | — | — |
| PLAY | STOP | FPS | RPS | STILL |
| STILL | PLAY | — | — | — |
| PAUSE | REC | — | — | REC CHECK |
| REC | PAUSE | — | — | — |
| RPS | PLAY | FPS | — | — |
| FPS | PLAY | — | RPS | — |

METHOD AND APPARATUS FOR SELECTING FUNCTIONAL MODES OF VIDEO CAMERA RECORDER USING A ONE KEY WIRE REMOTE CONTROLLER

FIELD OF THE INVENTION

This invention relates generally to the combined camera and video cassette recorder, and more particularly to the method for selecting mode by utilizing one key in the wire remote controller, so that the function mode of the camera recorder can be variously changed.

BACKGROUND OF THE INVENTION

Generally, the camera recorder which combines camera and video cassette recorder is provided with the wire remote controller having the same function as the release used in the still camera to prevent the set from moving when pressing the function key attached at the set body for taking a photograph.

The wire remote controller of the prior art is used when the camera recorder is to be stopped temporarily during a recording function after a temporary stop is performed. The recording and the temporary stop functions (i.e. pause mode) are separated every time a key is pressed.

However, the conventional wire remote controller can not perform any other functions excepting the recording and temporary stop functions, which is shown in FIG. 1.

As shown in FIG. 1, the wire remote controller consists of a function Key K1, a light emitting diode LED for displaying the recording state, and a jack 10a.

The remote controller 10 is connected to a jack 20a of the camera recorder 20 by using the plug 10a at need, so that the camera recorder 20 receives the input signal from the function Key K1, then performs the predetermined operation in the circuit portion 20c of the camera recorder, thereby driving the transistor Q1 by the output of the micro processor 20b.

That is, the conventional wire remote controller, performing only the record and pause motions, is used by connecting the LED driving voltage, the key input and the ground wires to the camera recorder 20 respectively.

In such a case, however, the wire remote controller is provided with each function key so as to perform various functions such as reproduce (PLAY), fast forward (FF), rewind (REW), standstill picture (STILL), etc. As a result, it is required that the connecting wires connected to the plug 10a to have anywhere from six to seven wires, not three.

Accordingly, the wire remote controller cannot be used to perform multi-functions but can only be used to perform the recording and temporary stop functions because the connecting wires are bulky in size and the jack 10a and jack 20a has to be made by a special process.

In addition, the camera recorder is to be designed for performing a multi-function using an integrated circuit, it can be expensive.

SUMMARY OF THE INVENTION

It is an object of this invention to provide a selecting mode method by operating one key, so that it can select one of the various modes such as PLAY, FF, REW, STILL, REC CHECK by operating one key while the existing wire remote controller having three wires is used independently.

To achieve the above object, the present invention uses the first step for changing the present mode into the temporary stop (pause), stop, record or reproduce mode after reading the present mode when pressing the one key one time; the second step for changing the present mode into the fast forward mode or forward picture search mode after reading the present mode state when pressing the one key two times; the third step for changing the present mode into the rewind mode or reverse picture search mode after reading the present mode when pressing the one key three times; and the fourth step for changing the present mode into the standstill picture mode or the record check mode after reading whether the one key is pressed the predetermined time or more, and reading the present mode.

BRIEF DESCRIPTION OF THE DRAWINGS

In the detailed description of the preferred embodiment of the invention presented below, reference is made to the accompanying drawings in which:

FIG. 3 is a mode changing table illustrating that the function of the present mode is changed by effecting the mode selection method in accordance with the present invention.

Figure 1:
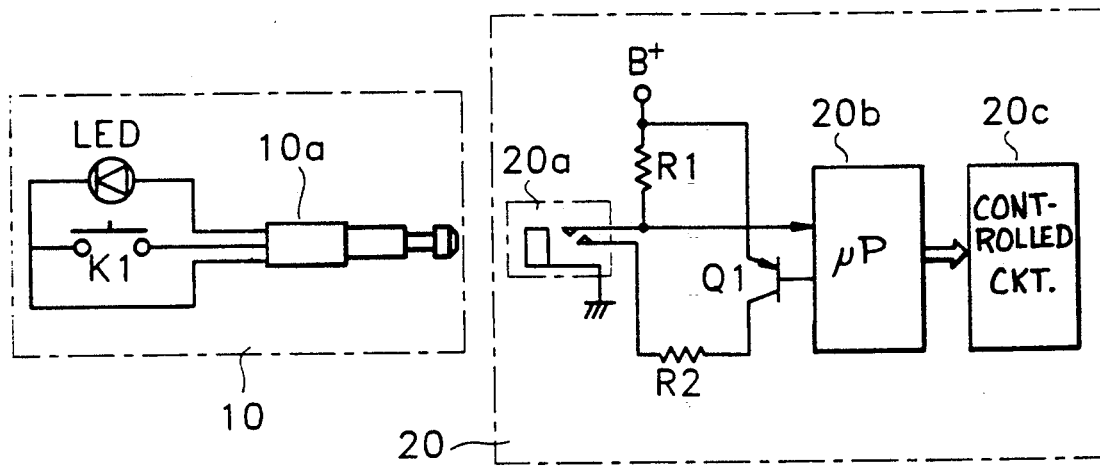
FIG. 1 is a schematic circuit diagram illustrating the camera recorder connected with the conventional remote controller.

The preferred embodiment of the camera recorder for performing the multi-function mode by ultilizing the conventional wire remote controller as it is, is illustrated in FIG. 1.

As shown in FIG. 1, after connecting the one-key three wire remote controller to the camera recorder 20 through a plug 10a and a jack 20a, the function key K1 is pushed. Thereupon, the selected function mode is determined in the micro processor 20b, so that the transistor Q1 is controlled by the micro processor 20b and the light emitting diode LED is turned ON during the record mode and is turned off during the temporary stop mode.

At this time, the micro processor 20b of the camera recorder 20 which checks the pressing of the function key K1 of the controller 10, and allows the light emitting diode LED to be turned on by driving the transistor Q1, controls each function by controlling the circuit portion 20c of the camera recorder.

As mentioned above, according to the present invention, the micro processor 20b recognizes the key input depending upon the pressing of the function key K1 and determines mode to be changed depending upon the present mode.

Figure 2:
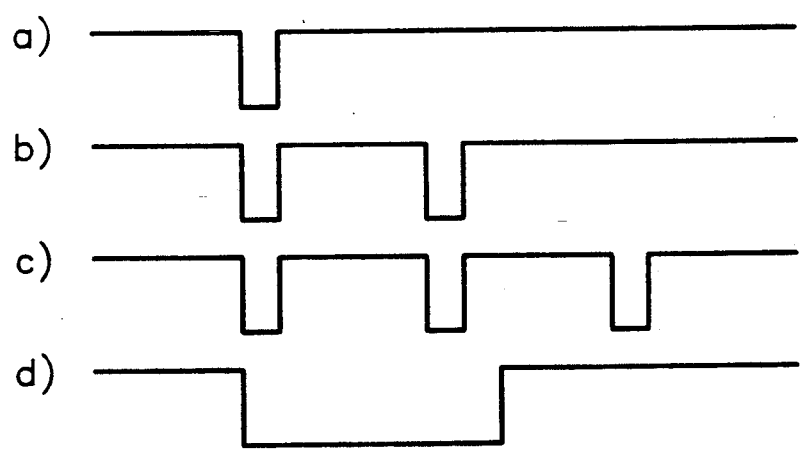
FIG. 2 is a timing chart for use in performing the mode selection method in accordance with the present invention.

The timing chart of the function by K1 is shown in FIG. 2 and the mode changing table for changing the present mode into the predetermined mode depending upon the input of the key is shown in FIG. 3.

Referring to FIG. 2, the input wave form signals a, b, and c of the key K1 by pressing one time, two times and three times respectively, within the predermined time, and the input wave form signal d of the key K1 by continuously pressing for a predetermined time or over are applied to the micro processor so that the micro processor 20b determines whether the function key K1 is pressed a number of times and how many times or is pressed continuously for a predetermined time or longer.

Figure 4A:
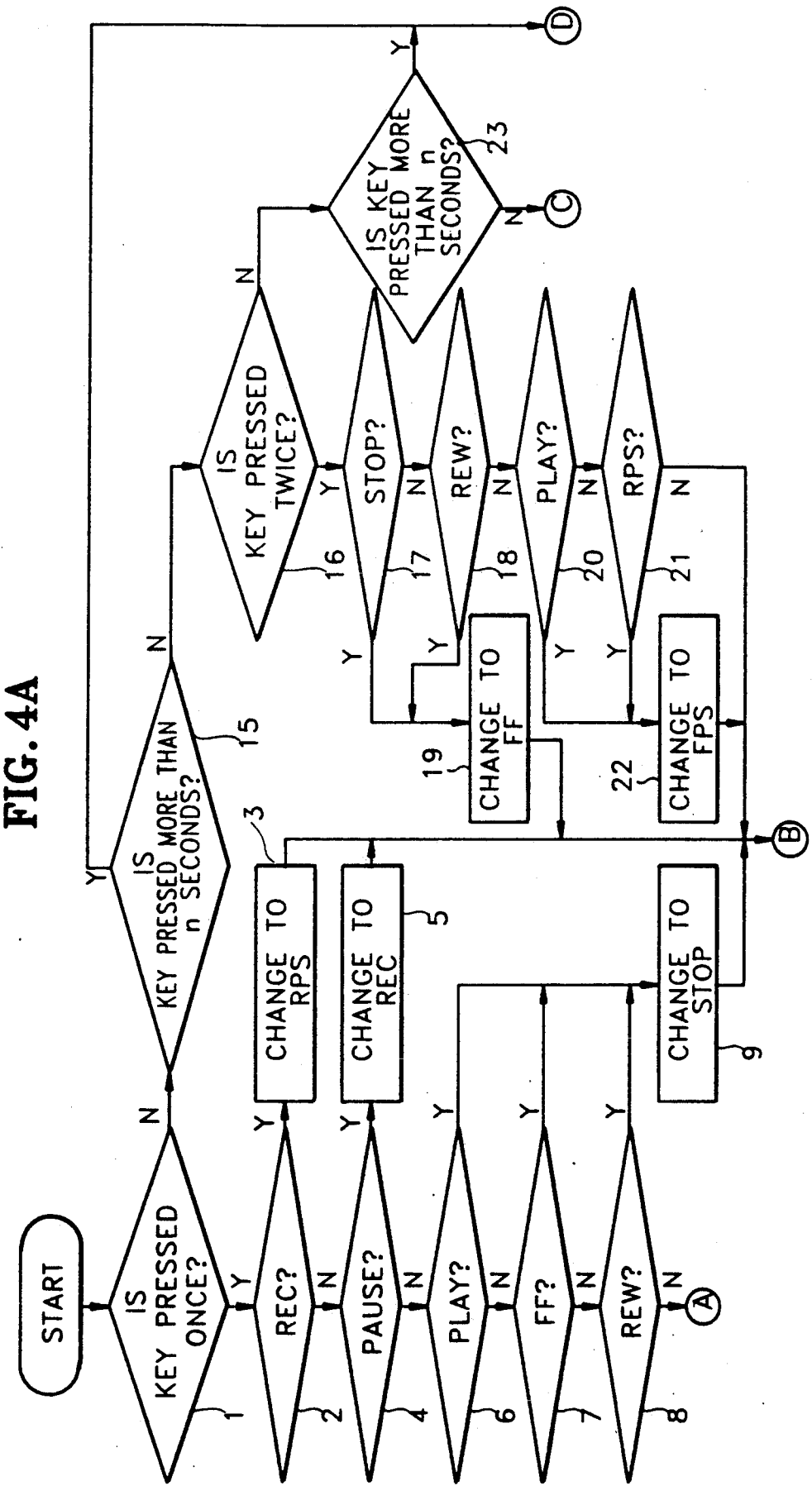
FIGS. 4A and 4B together show a flow chart illustrating an embodiment of the mode selection method in accordance with the present invention.
Figure 4B:
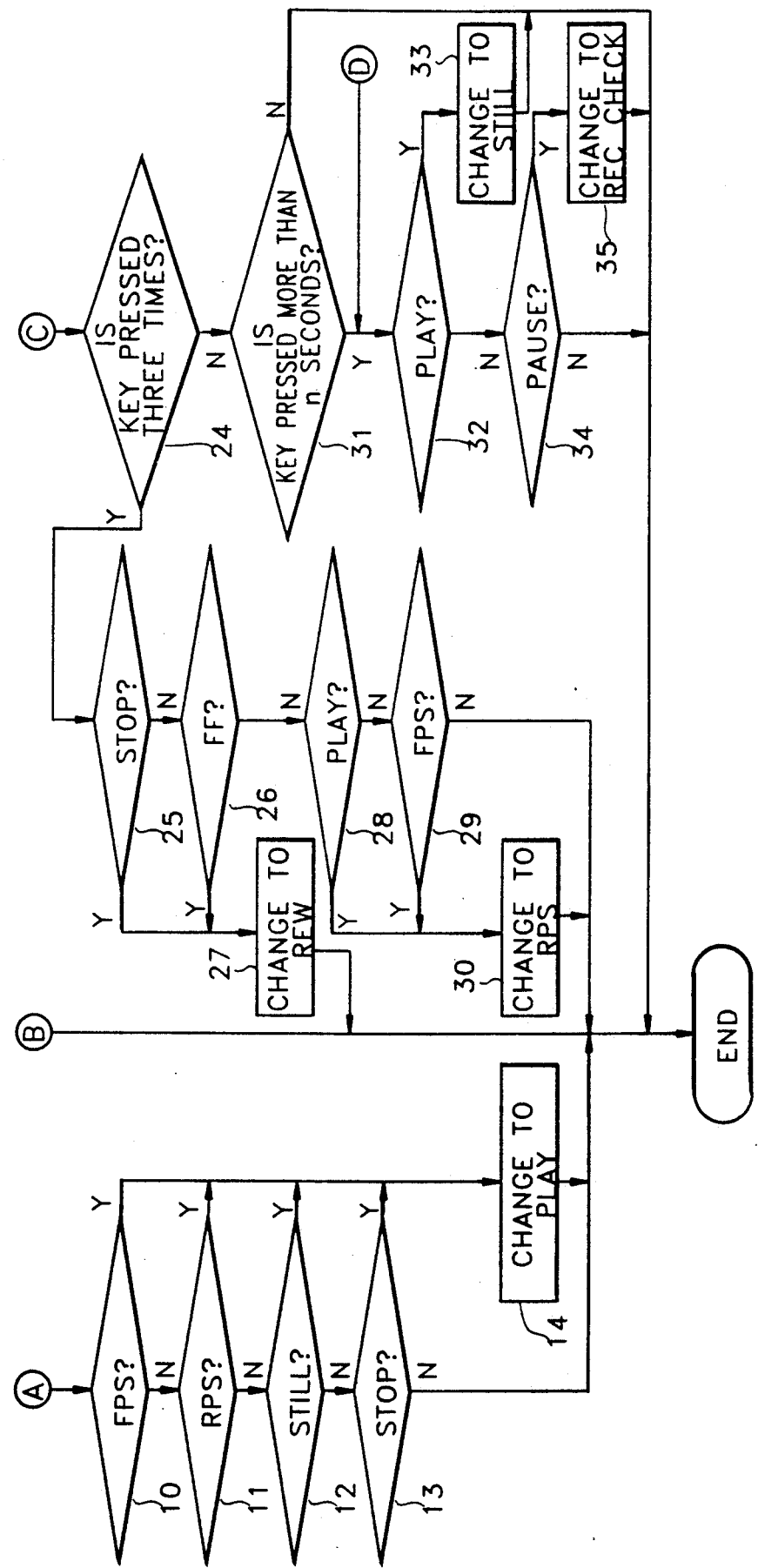

The operation according to the FIG. 3 will be described with reference to the flow chart shown in FIGS. 4A and 4B.

In the first step, micro processor 20b checks whether key K1 is pressed one time or not.

If it recognizes so, the 1A process for changing the present mode into the temporary stop mode (PAUSE) is performed in the second step, and if the present mode is the temporary stop mode, the 1B process for changing it into the recording mode is performed in the fourth step.

In the sixth through eight steps if the present mode is the play mode, fast forward mode or rewind mode, it is changed to the stop mode (the 1C process), in the tenth through thirteenth steps if the present mode is forward picture search (FPS) mode, reverse picture search (RPS) mode, standstill (STILL) mode or stop mode it is changed to the reproducing mode (the 1D process).

In addition, in the first step if the key K1 is not pressed one time or in the fifth step if the key K1 is not pressed the predetermined N sec or over it is read in the sixth step whether the key k1 is pressed two times.

When the micro processor 20b recognizes that the key k1 is pressed two times in the sixteenth step, if the present steps of the seventeeth and eighteenth modes are the stop or rewind mode, the 2A process which is for changing into the fast forward mode is performed, and in the 20th and 21th steps if the present mode is the reproducing or PRS mode, the 2B process which is for changing to the FPS mode is performed.

Furthermore, if the key k1 is not pressed two times in the sixteenth step or not pressed the predetermined sec or over in the 23th step, it is readed whether the key k1 is pressed three times in the 24th step.

With the microprocess 20b recognizes that the key k1 is pressed three times in the 24th step, if the present modes of the 25th and 26th steps are the fast forward modes the 3A process which is for changing it into the rewind mode is performed, while, if the present mode is the reproduce or FPS mode in the 28th and 29th step, the 3B process which is for change it into RPS is performed.

If, in the 24th step, the key K1 is not pressed three times, it is read in the 31th step whether key K1 is processed at the predetermined N sec or over.

At this time, when the key k, is pressed the predetermined n sec or over, if the present mode of the 32nd step is the reproducing mode, the 4A process which is for changing it into the standstill mode is performed, and in the 34th step if the present mode is the temporary stop mode the 4B process which for changing it into the record check mode is performed.

As stated above, the present invention provide the multi-function selecting method by operating the one key of the wire remote controller, which can simply perform the various functions by pressing the key of the wire remote controller and without increasing the number of the connecting wire of the wire remote controller.

What is claimed is:

1. A method for selecting functional modes of a video camera recorder using a wire remote controller with one function key, comprising the steps of:

changing a present functional mode into a pause mode, a stop mode or a reproduce mode after reading said present functional mode when said function key is pressed for a short duration one time;

changing the present functional mode into a fast forward mode or a forward picture search mode after reading said present functional mode when said function key is pressed two discontinuous times, each being of said short duration;

changing the present functional mode into a rewind mode or a reverse picture search mode after reading said present functional mode when said function key is pressed three discontinuous times, each being of said short duration; and changing the present functional mode into a standstill picture mode or a record check mode after reading said present functional mode when said function key is pressed for a prolonged period of time.

2. The method for selecting modes according to claim 1, wherein said step for changing the present functional mode into a pause mode is executed if said present functional mode is in a recording mode;

said step for changing the present functional mode into a stop mode is executed if said present functional mode is in either a reproduce mode, a fast forward mode or a rewind mode; and said step for changing the present functional mode into a reproduce mode is executed if said present functional mode is in either a forward picture search mode, a reverse picture search mode, or a standstill picture mode.

3. The method for selecting modes according to claim 1, wherein said step for changing the present functional mode into a fast forward mode is executed if said present functional mode is in either a stop mode or a rewind mode.

4. The method for selecting modes according to claim 1, wherein said step for changing the present functional mode into a rewind mode is executed if said present functional mode is in either a stop mode or a fast forward mode, and said step for changing the present functional mode into a reverse picture search mode is executed if said present functional mode is in either a reproduce mode or a forward picture search mode.

5. The method for selecting modes according to claim 1, wherein said step for changing the present functional mode into a standstill picture mode is executed if said present functional mode is in a reproduce mode, and said step for changing the present functional mode into a record check mode is executed if said present functional mode is in a pause mode.

6. A wire remote controlling apparatus equipped with one function key for selecting a plurality of functional modes of a video image recorder means, comprising:

a three wire remote controller with a function key for selecting a plurality of functional modes of a video image recorder by pressing said function key one or more discontinuous and successive times of short duration or one prolonged time of predetermined time interval to provide signals indicative of one press, two successive presses, three successive presses or one extended press, respectively;

microprocessor means responsive to a present functional mode of said video image recorder and one of said signals provided from said function key, for changing said present functional mode into a pause mode, a stop mode or a reproduce mode when said signal provided from said function key is indicative of said one press, for changing said present functional mode into a fast forward mode or a forward picture search mode when said signal provided from said function key is indicative of said two successive presses, for changing said present functional mode into a rewind mode or a reverse picture search mode when said signal provided from said function key is indicative of said three successive presses, or for changing said present functional mode into a standstill picture mode or a record check mode when said signal provided from said function key is indicative of said one extended press.

7. The wire remote controlling apparatus as recited in claim 6, wherein the present functional mode is changed into a pause mode if said present functional mode is in a recording mode; a stop mode if said present functional mode is in either a reproduce mode, a fast forward mode, or a rewind mode; and a reproduce mode if said present functional mode is in either a forward picture search mode, a reverse picture search mode, or a standstill picture mode.

8. The wire remote controlling apparatus as recited in claim 6, wherein the present functional mode is changed into a fast forward mode if said present functional mode is in either a stop mode or a rewind mode.

9. The wire remote controlling apparatus as recited in claim 6, wherein the present functional mode is changed into a rewind mode if said present functional mode is in either a stop mode or a fast forward mode; a reverse picture search mode if said present functional mode is in either a reproduce mode or a forward picture search mode.

10. The wire remote controlling apparatus as recited in claim 6, wherein the present functional mode is changed into a standstill mode if said present functional mode is in a reproduce mode; a record check mode is said present functional mode is in a pause mode.

* * * * *

UNITED STATES PATENT AND TRADEMARK OFFICE
CERTIFICATE OF CORRECTION

PATENT NO. : 5,134,497
DATED : July 28, 1992
INVENTOR(S) : Dong-Young Kim

It is certified that error appears in the above-indentified patent and that said Letters Patent is hereby corrected as shown below:

Column 6, line 18, change "is" to --if--.

Signed and Sealed this

Twenty-eighth Day of September, 1993

Attest:

BRUCE LEHMAN

*Attesting Officer*   *Commissioner of Patents and Trademarks*